United States Patent
Vivanco et al.

(10) Patent No.: US 9,313,136 B1
(45) Date of Patent: Apr. 12, 2016

(54) MANAGING DATA RETRANSMISSION TO A WIRELESS DEVICE

(71) Applicant: Sprint Spectrum LP, Overland Park, KS (US)

(72) Inventors: Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 84 days.

(21) Appl. No.: 14/201,742

(22) Filed: Mar. 7, 2014

(51) Int. Cl.
*H04L 1/00* (2006.01)
*H04L 12/841* (2013.01)
*H04L 12/26* (2006.01)

(52) U.S. Cl.
CPC .......... *H04L 47/283* (2013.01); *H04L 43/0829* (2013.01); *H04L 43/0864* (2013.01)

(58) Field of Classification Search
None
See application file for complete search history.

(56) References Cited

U.S. PATENT DOCUMENTS

| | | | |
|---|---|---|---|
| 8,130,776 B1 * | 3/2012 | Sundararajan et al. | 370/401 |
| 2011/0041041 A1 | 2/2011 | Kim | |
| 2012/0314655 A1 | 12/2012 | Xue et al. | |
| 2014/0112352 A1 * | 4/2014 | Li et al. | 370/474 |

* cited by examiner

*Primary Examiner* — Kouroush Mohebbi

(57) ABSTRACT

First data packets for a wireless device are received at a network element and are encoded into at least one second data packet, the second data packet comprising at least two of the first data packets. The at least one second data packet is sent from the network element to the wireless device. A round trip time related to the at least one second data packet, and a frequency band load of a frequency band to deliver the at least one second data packet to the wireless device are determined. A number of permitted retransmissions of the at least one second data packet from the access node to the wireless device is adjusted based on the round trip time and the frequency band load.

11 Claims, 6 Drawing Sheets

MANAGING DATA RETRANSMISSION TO A WIRELESS DEVICE

TECHNICAL BACKGROUND

Data packet loss, in which a data packet intended for a receiving device fails to arrive, or arrives after a predetermined time period, can be caused by network congestion, wireless communication link interference, and a variety of other causes. To mitigate data packet loss, data packets can be repeatedly sent and re-sent, which increases packet reception at a cost of increasing network congestion. Retransmission request mechanisms can also be employed, which can also increase network congestion, owing to an increase in signaling associated with retransmission requests and subsequent packet retransmission. Further, network coding can be applied to mitigate packet loss, but the successful application of network coding is also affected by network congestion and packet loss, among other things.

OVERVIEW

In operation, first data packets for a wireless device are received at a network element and are encoded into at least one second data packet, where the second data packet comprises at least two of the first data packets. The at least one second data packet is then sent from the network element to the wireless device. A round trip time related to the at least one second data packet is determined. A frequency band load of a frequency band between an access node and the wireless device to deliver the at least one second data packet to the wireless device is also determined. Based on the round trip time and the frequency band load, a number of permitted retransmissions of the at least one second data packet from the access node to the wireless device is adjusted. In an embodiment, when a number of retransmissions of the at least one second data packet from the access node to the wireless device meets the adjusted number of permitted retransmissions of the at least one second data packet, the at least one second data packet can be re-sent from the network element to the wireless device.

DETAILED DESCRIPTION

Figure 1:
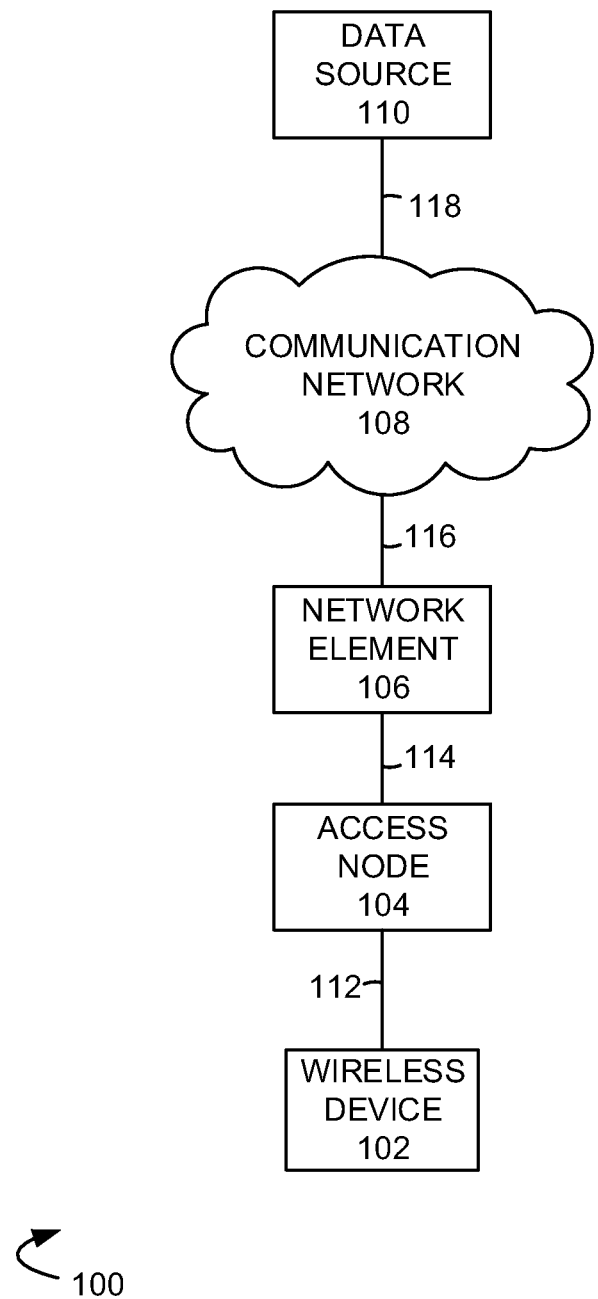
FIG. 1 illustrates an exemplary communication system to manage data retransmission to a wireless device.

FIG. 1 illustrates an exemplary communication system 100 to manage data retransmission to a wireless device comprising wireless device 102, access node 104, network element 106, communication network 108, and data source 110. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication link 112. Communication link 112 can comprise a frequency band, such as, for example, 800 MHz, 1.9 GHz, 2.5 GHz, and the like. A frequency band can comprise one or more channels, and each channel can comprise a frequency bandwidth within the frequency band.

Access node 104 is a network node capable of providing wireless communications to wireless device 102, and can be, for example, a base transceiver station, a radio base station, an eNodeB device, or an enhanced eNodeB device. Access node 104 is in communication with network element 106 over communication link 114.

Network element 106 can comprise a processor and associated circuitry, and can be configured to receive first data packets for wireless device 102 and to encode the first data packets into at least one second data packet. The at least one second data packet can comprise at least two of the first data packets. Network element 106 can be further configured to provide the at least one second data packet to access node 104 using a data redundancy factor. The first data packets can be received from another network element of communication system 100, such as data source 110. Network element 106 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Network element 106 can receive instructions and other input at a user interface. Examples of network element 106 can include one or more computing devices or a network components, such as an access service network gateway (ASN-GW), a packet data network gateway (P-GW), a serving gateway (S-GW), a mobile switching center (MSC), a dispatch call controller (DCC), a mobility management entity (MME), a radio network controller (RNC), a mobile switching controller (MSC), a packet data serving node (PDSN), a subscriber profile system (SPS), and an authentication, authorization, and accounting (AAA) equipment, including combinations thereof. Network element 106 is in communication network 108 over communication link 116.

Data source 110 comprises a network element of communication system 100 which can be configured to send first data packets to network element 106, e.g., in response to a request for the first data packets from wireless device 102. Data source 110 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Data source 110 can receive instructions and other input at a user interface. Examples of data source 110 can include one or more computing devices or a network components, such as a server, a router, a gateway, or another computing device. Data source 110 is in communication network 108 over communication link 118.

Communication network 108 can comprise a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 108 comprise Ethernet, Fast Ethernet, Gigabit Ethernet, LocalTalk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 112, 114, 116, and 118 can comprise wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 104, network element 106, communication network 108, and data source 110 which are omitted for clarity, including additional processing nodes, routers, gateways, and physical and/or wireless data links for carrying data among the various network elements.

Data packet loss, in which a data packet intended for a receiving device fails to arrive, or fails to arrive within a predetermined time period and is declared lost, is a common issue in wireless communication systems. Such packet loss can be arise from a variety of causes, including network congestion and wireless communication link interference. Various techniques can be applied to mitigate packet loss. Network coding can be applied, by which first data packets can be decoded from second data packets, but the successful application of network coding is affected by network congestion and packet loss of the second data packets, among other things. Packet retransmission can also be used, for example, from a data source (e.g., data source 110) to a receiver (e.g., wireless device 102), but network congestion and signaling overhead tend to increase as retransmissions increase. Additionally, packets can be retransmitted from an access node (e.g., access node 104) to the receiving wireless device (e.g., wireless device 102), but such retransmissions tend to increase utilization or load of the wireless communication link. A combination of techniques can be used, provided that the combination is balanced to limit increases in network congestion, signaling overhead, and/or communication link load.

In operation, first data packets for wireless device 102 are received at network element 106, and the first data packets are encoded into at least one second data packet. The at least one second data packet comprises at least two of the first data packets. Then, the at least one second data packet is sent to wireless device 102, for example, by access node 104. A round trip time related to the at least one second data packet is determined. The round trip time can be determined based on information sent to data source 110, such as an acknowledgment message from wireless device 102, when the second data packet is decoded at wireless device 102 into the at least two first data packets. In addition, a frequency band load of a frequency band (e.g., communication link 112) between access node 104 and wireless device 102 is determined. Based on the round trip time and the frequency band load, a number of permitted retransmissions of the at least one second data packet from the access node to the wireless device is adjusted.

Figure 2:
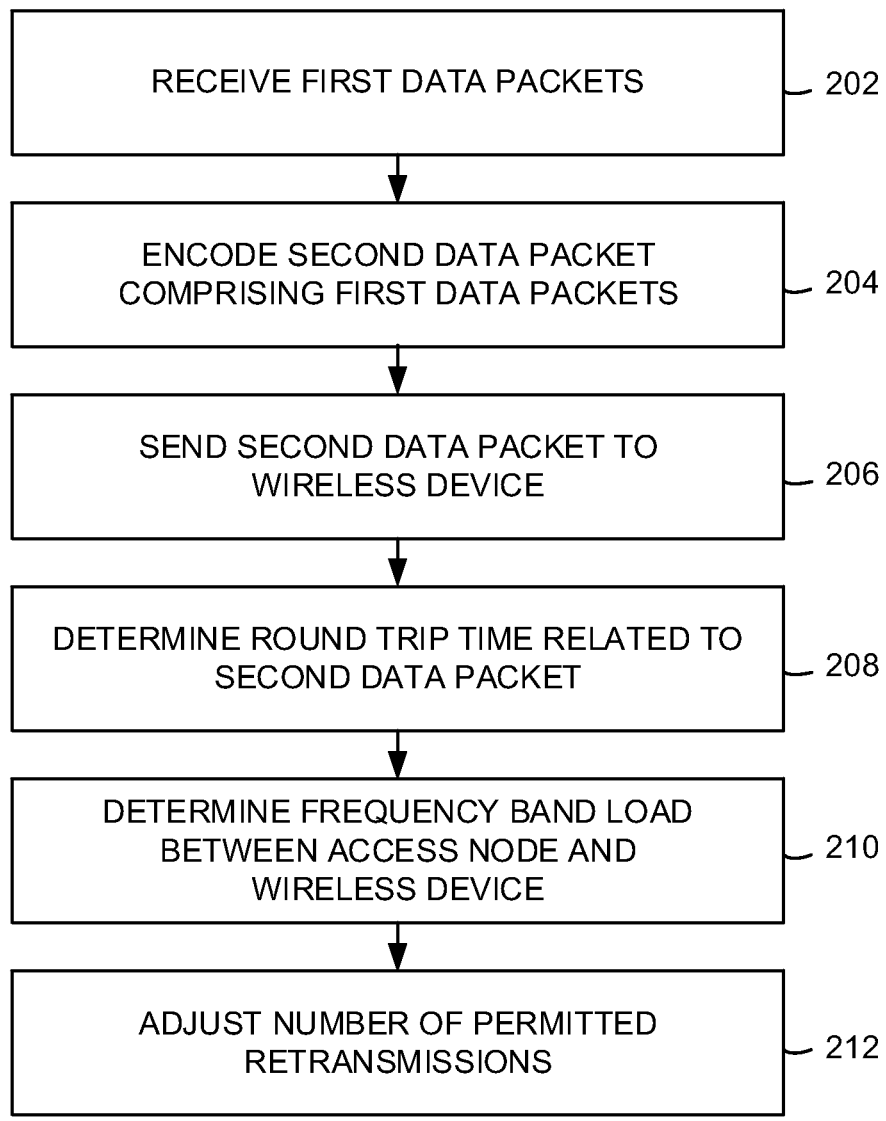
FIG. 2 illustrates an exemplary method of managing data retransmission to a wireless device.
Figure 3:
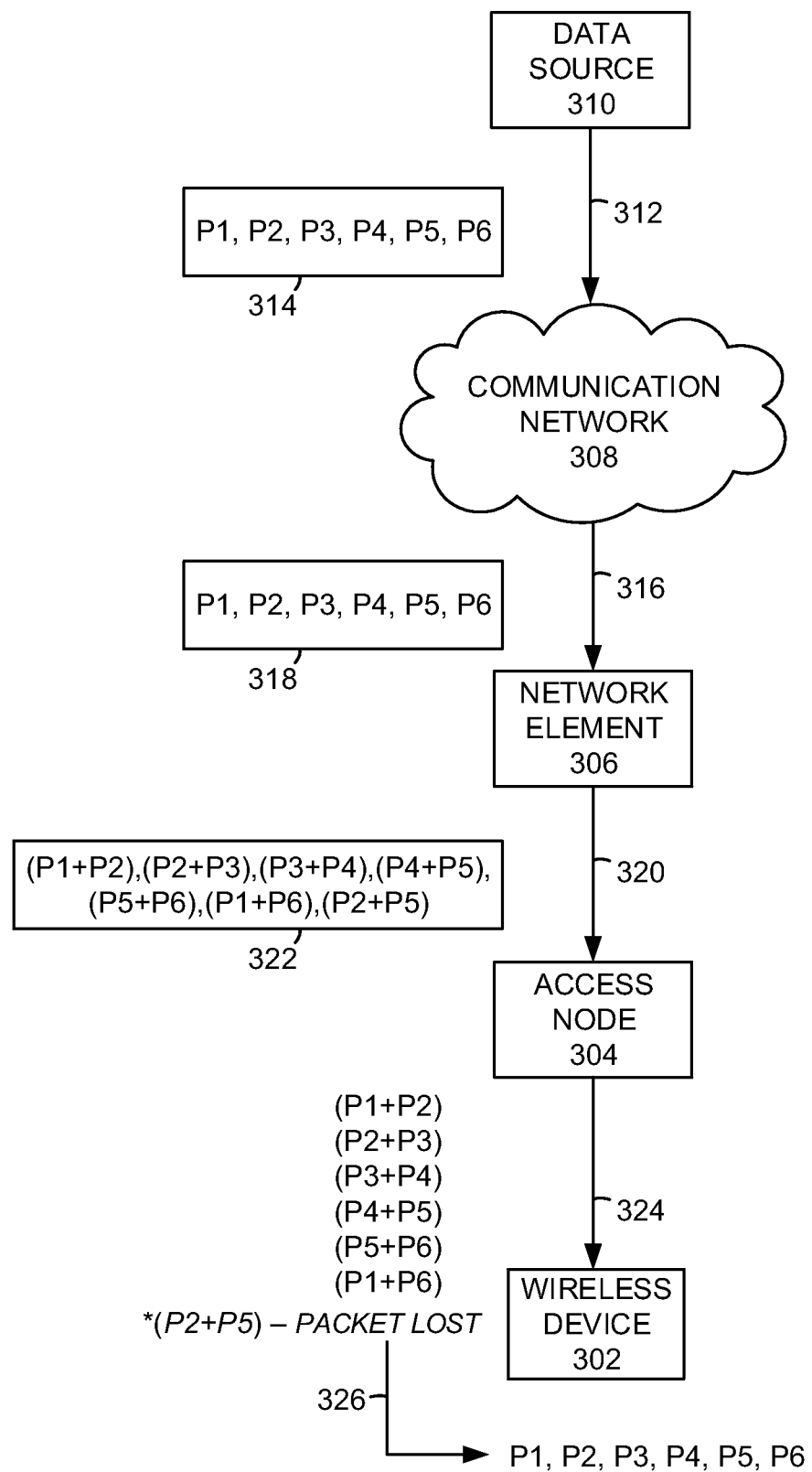
FIG. 3 illustrates an exemplary functional diagram illustrating managing data retransmission to a wireless device.

FIG. 2 illustrates an exemplary method of managing data retransmission to a wireless device. First data packets are received for the wireless device (operation 202), and the first data packets are encoded into at least one second data packet, each second data packet comprising at least two of the first data packets using a data redundancy factor (operation 204). For example, referring to FIG. 3, first data packets 314 comprising exemplary packets P1, P2, P3, P4, P5, and P6 (the number of which is merely exemplary and is not limiting) can be sent by data source 310 over communication link 312 to communication network 308, and can be received as first data packets 318 at network element 306 over communication link 316. The first data packets can be encoded at network element 306 into at least one second data packet, which can comprise at least two of the first data packets. For example, first data packets P1-P6 can be encoded at network element 306 into second data packets 322. Second data packets 322 comprise exemplary packets P1+P2, P2+P3, P3+P4, P4+P5, P5+P6, P1+P6, and P2+P5. In an embodiment, second data packets 322 can be encoded using linear network coding or a similar coding method.

Returning to FIG. 2, at least one second data packet is then sent from the from the network element to the wireless device (operation 206). For example, second data packets 322 (FIG. 3) can be provided to from network element 306 to access node 304 over communication link 320, and then second data packets 322 can be scheduled for delivery from access node 304 to wireless device 302 over communication link 324. At least one second data packet 322 can then be sent from access node 304 to wireless device 302 over first communication link 324. The use of second data packets to convey the information of the first data packets enhances the robustness of the communication of the first data packets to the wireless device. For example, packet P2+P5 can be lost over communication link 324. However, the information in second data packet P2+P5, namely first data packets P2 and P5, can be recovered from other second data packets when the second data packets are decoded at wireless device 302. Thus, first packets P1-P6 can be decoded (326) from the second data packets. In operation, a threshold number of second data packets typically must be received at wireless device 302 before wireless device 302 can begin to decode the second data packets into the first data packets.

Referring again to FIG. 2, a round trip time related to the at least one second data packet is determined (operation 208). For example, when wireless device 302 receives second data packets 322, first packets P1-P6 can be decoded (326) from the second data packets received, and for each first data packet decoded at wireless device 302, wireless device 302 can send an acknowledgement message (e.g., an ACK or similar message) to data source 310. Based on the time at which each first data packet was sent from data source 110, and a time an acknowledgement message corresponding to each first data packet is received at data source 110, a round trip time can be calculated for each first data packet. Even though first data packets P2 and P5 can be recovered from other second data packets when the second data packets are decoded, the loss of second data packet P2+P5 can still delay the sending of an acknowledgement message for packets P2 and P5, because when second data packet P2+P5 is lost, additional second data packets are typically required to properly decode the second data packets. Thus, packet losses of the second data packets can be determined by a sender such as data source 310 based on the round trip time, because round trip time will typically increase with the loss of the second data packets.

Returning to FIG. 2, next, a frequency band load of a frequency band between an access node and the wireless device to deliver the at least one second data packet to the wireless device is determined (operation 210). The frequency band load can comprise a congestion level, an amount of data carried over the frequency band, a requested amount of data to be carried over the frequency band (as may be determined from a buffer status report or similar request for wireless communication link resources), an amount of data buffered for transmission over the frequency band, a data rate, a data throughput, a data delay, a data loss rate, a rate of retransmission requests, a level of signal interference, and the like, including combinations thereof. For example, the frequency band load of communication link 324 (FIG. 3) can be determined at wireless device 302 and/or access node 304 based on the transmission of the second data packets to wireless device 302.

Then, in operation 212 (FIG. 2), based on the round trip time and the frequency band load of the frequency band, a number of permitted retransmissions of the at least one second data packet from the access node to the wireless device is adjusted. For example, a retransmission technique can be used between access node 304 and wireless device 302 wherein wireless device 302 can request a retransmission of a packet which is lost, corrupted, or otherwise cannot be properly decoded. Such retransmission technique can comprise Automatic Retransmission Request (ARQ), hybrid Automatic Retransmission Request (HARD), and the like. The access node can buffer or otherwise store second data packets sent to the wireless device, and can re-send second data packets when requested by the wireless device. In an embodiment, the number of permitted retransmissions from the access node to the wireless device can be set relatively low, or can be set to zero. For example, when the round trip time related to the second data packets is relatively low, or when the frequency band load is relatively low, it can be determined that wireless device 302 receives sufficient second data packets to successfully decode the first data packets at a sufficient rate. However, when the round trip time increases, or when the frequency band load increases, the number of permitted retransmission of the second data packets can be increased, to enable the retransmission of second data packets which are lost, corrupted, or otherwise not decodable at the wireless device.

Figure 4:
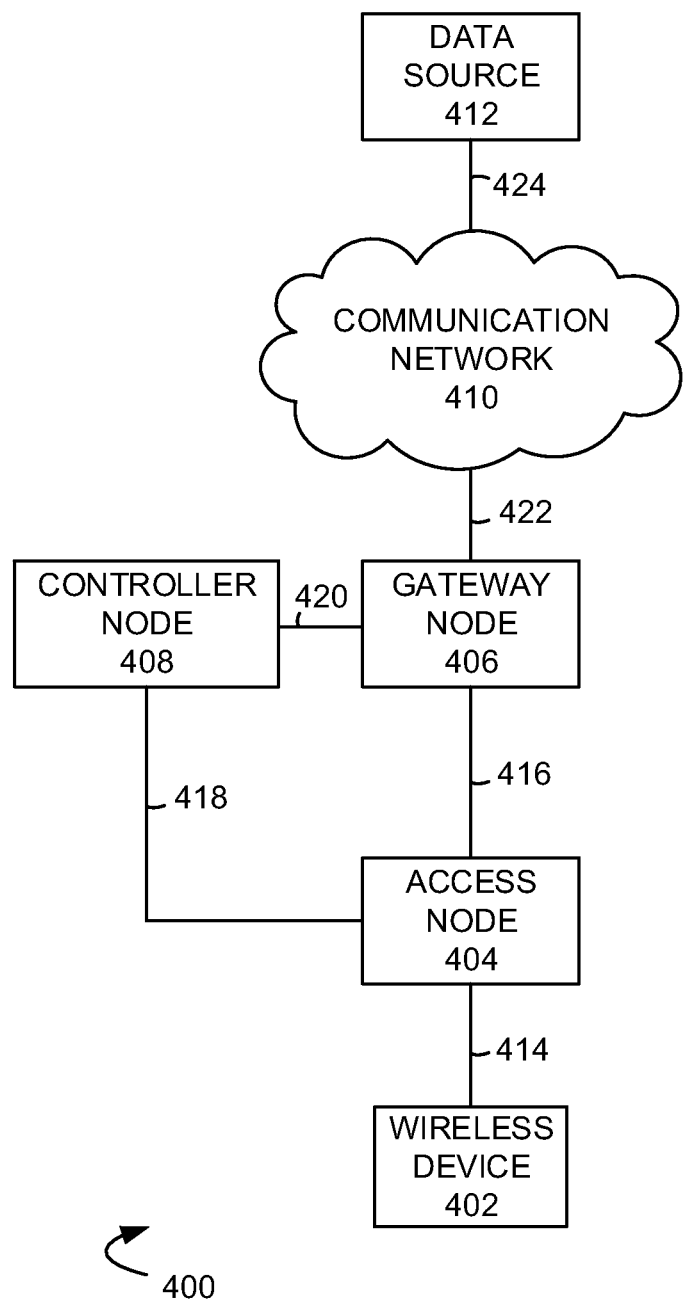
FIG. 4 illustrates another exemplary communication system to manage data retransmission to a wireless device.

FIG. 4 illustrates another exemplary communication system 400 to manage data retransmission to a wireless device comprising wireless device 402, access node 404, gateway node 406, controller node 408, communication network 410, and data source 412. Examples of wireless device 402 can comprise a cell phone, a smart phone, a computing platform such as a laptop, palmtop, or tablet, a personal digital assistant, or an internet access device, including combinations thereof. Wireless device 402 can communicate with access node 404 over communication link 414. Communication link 414 can comprise a frequency band.

Access node 404 is a network node capable of providing wireless communications to wireless device 402, and can be, for example, a base transceiver station, a radio base station, an eNodeB device, or an enhanced eNodeB device. Access node 404 is in communication with gateway node 406 over communication link 416, and with controller node 408 over communication link 418.

Gateway node 406 can comprise a processor and associated circuitry to execute or direct the execution of computer-readable instructions, and can be configured to maintain network connection information associated with wireless device 402. Gateway node 406 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 406 can receive instructions and other input at a user interface. Examples of gateway node 406 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and a network gateway, including combinations thereof. Gateway node 406 is in communication with communication network 410 over communication link 422.

Controller node 408 can comprise a processor and associated circuitry to execute or direct the execution of computer-readable instructions, and can be configured to control the setup and maintenance of a communication session over communication network 410 for wireless device 402, as well as to maintain network connection information associated with wireless device 402. Controller node 408 can comprise a mobile switching center (MSC), a dispatch call controller (DCC), a mobility management entity (MME), or other similar network node. Controller node 408 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 is in communication with gateway node 406 over communication link 420.

Data source 412 comprises a network element of communication system 400 which can be configured to send first data packets to gateway node 406, e.g., in response to a request for the first data packets from wireless device 402. Data source 412 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Data source 412 can receive instructions and other input at a user interface, and can be configured to send first data packets to gateway node 406. Examples of data source 412 can include one or more computing devices or a network components, such as a server, a router, a gateway, or another computing device. Data source 412 is in communication network 410 over communication link 424.

Communication network 410 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 410 can be capable of carrying voice information and other data, for example, to support communications by a wireless device such as wireless device 402. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 410 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 410 may also comprise a wireless network, including base stations, wireless communication nodes, telephony switches, internet routers, network gateways, computer systems, communication links, or some other type of communication equipment, and combinations thereof.

Communication links 414, 416, 418, 420, and 422 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 404, gateway node 406, controller node 408, communication network 410, and data source 412 which are omitted for clarity, including additional processing nodes, routers, gateways, and physical and/or wireless data links for carrying data among the various network elements.

Figure 5:
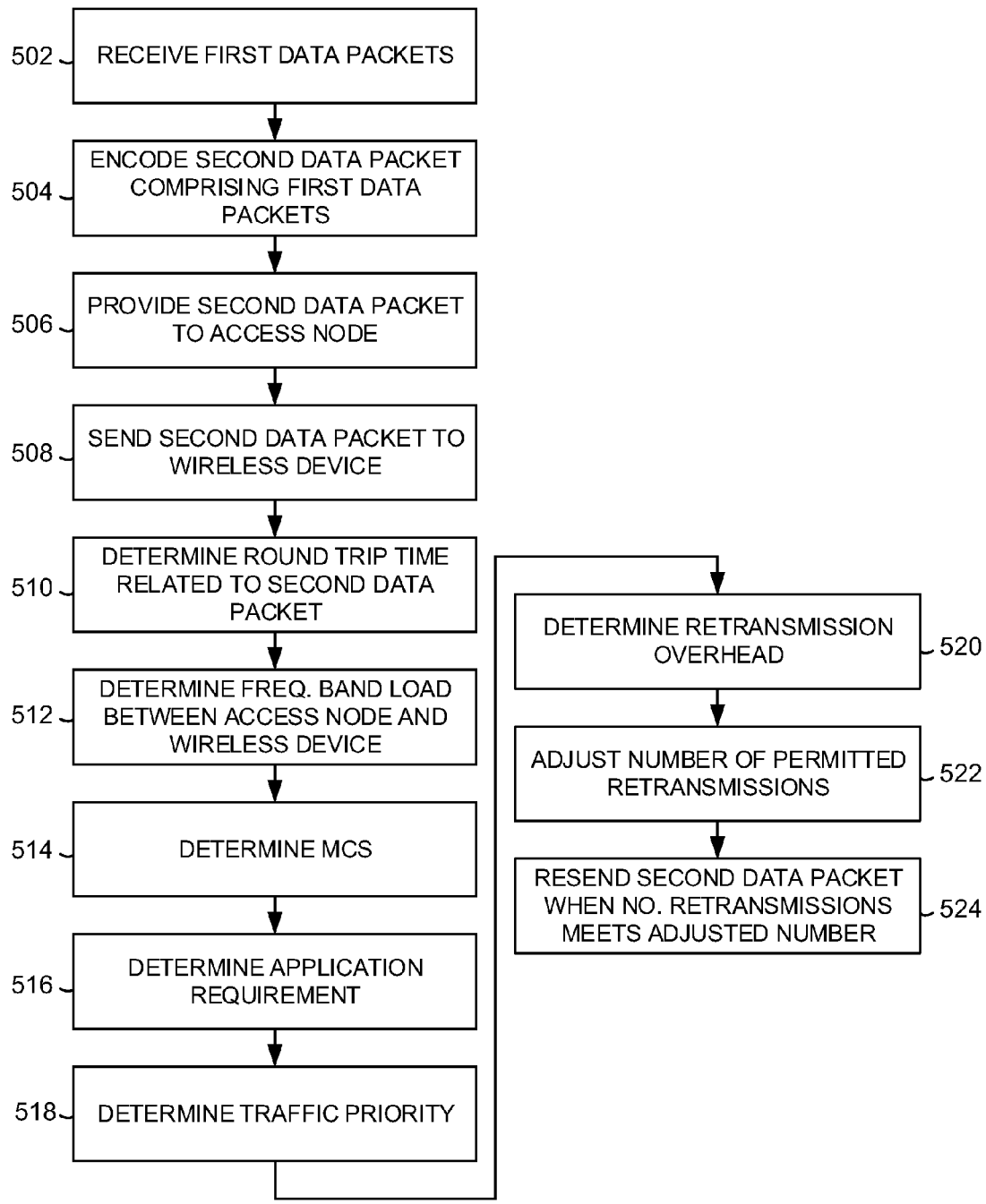
FIG. 5 illustrates another exemplary method of managing data retransmission to a wireless device.

FIG. 5 illustrates another exemplary method of managing data retransmission to a wireless device. First data packets are received for the wireless device (operation 502), and the first data packets are encoded into at least one second data packet, each second data packet comprising at least two of the first data packets (operation 504). For example, referring to FIG. 4, first data packets can be sent by data source 412 over communication link 424 to communication network 410, and the first data packets can be received at gateway node 406 over communication link 422. The first data packets can be encoded at gateway node 406 into at least one second data packet, which can comprise at least two of the first data packets. A number of second data packets can be encoded according to a data redundancy factor. In an embodiment, second data packets can be encoded using linear network coding or a similar coding method. The second data packets can then be provided to access node 404 over communication link 414 (operation 506).

At least one second data packet is then sent from the access node to the wireless device over a frequency band (operation 508). For example, second data packets can be scheduled for delivery to wireless device 402 (FIG. 4) over communication link 414. At least one second data packet can then be sent from access node 404 to wireless device 402 over first communication link 402. The use of the second data packets to convey the information of the first data packets enhances the robustness of the communication of the first data packets to the wireless device, for example, by enabling the recovery of first data packets even when a second data packet is lost, reducing the need for a packet retransmission request and for retransmission of packets. In operation, a threshold number of second data packets typically must be received at wireless device 402 before wireless device 402 can begin to decode the second data packets into the first data packets.

A round trip time related to the second data packet is then determined (operation 510). For example, when wireless device 402 receives the second data packets, the first packets can be decoded from the second data packets received, and for each first data packet decoded at wireless device 402, wireless device 402 can send an acknowledgement message (e.g., an ACK or similar message) to data source 412. In an embodiment, the acknowledgment message comprises a transfer control protocol (TCP) acknowledgement message. Based on the time at which a first data packet was sent (e.g., from data source 412) and a time of an acknowledgement message associated with the decoding of the first data packet, a round trip time can be calculated for the first data packet. When a second data packet is lost, additional second data packets are typically required to properly decode the second data packets. Thus, when a second data packet is lost round trip time associated with the encoded first data packets can increase. An increase in round trip time can therefore be correlated with second data packet loss.

A frequency band load of the first frequency band is also determined (operation 512). The first frequency band load can comprise a congestion level, an amount of data carried over the first frequency band, a requested amount of data to be carried over the first frequency band (as may be determined from a buffer status report or similar request for wireless communication link resources), an amount of data buffered for transmission over the first frequency band, a data rate, a data throughput, a data delay, a data loss rate, a rate of retransmission requests, a level of signal interference, and the like, including combinations thereof. The first frequency band load of communication link 414 (FIG. 4) can be determined at wireless device 402 and/or access node 404 based on the transmission of the second data packets to wireless device 402.

A modulation and coding scheme (MCS) assigned to send the at least one second data packet to the wireless device is then determined (operation 518). The modulation and coding scheme can comprise an indication of data carrying capacity over time, such as quadrature phase shift keying (QPSK), 16-quadrature amplitude modulation (QAM), 64QAM, and the like. The MCS can further comprise a forward error correction element, such as ½, ¾. and the like. The amount of frequency band resources required to send the at least one second data packet over the first frequency band and the MCS can provide further indications of the resource utilization impact of sending the at least one second data packet over the frequency band. The MCS can provide a factor which can be used in determining whether to adjust a number of permitted retransmissions of the at least one second data packet from the access node to the wireless device.

Next, an application requirement of an application running on the wireless device is determined (operation 516). The application requirement can comprise a minimum data rate, a maximum permitted data delay, a minimum throughput, a maximum error rate, a maximum data loss rate, and the like, of an application running on a wireless device, required for the application to provide a threshold level of performance. The application requirement can also be determined based on the application type, such as whether the application is a relatively delay sensitive application (such as a streaming audio application a streaming video application, a voice application, and the like) or a relatively delay insensitive application (such as an email application, a messaging application, a web browsing application, and the like). The application requirement can provide a factor which can be used in determining whether to adjust a number of permitted retransmissions of the at least one second data packet from the access node to the wireless device.

A traffic priority of the at least one second data packet sent to the application is then determined (operation 518). The traffic priority can comprise a characteristic of a bearer channel established over the wireless communication link for the application running on the wireless device. For example, the traffic priority can comprise guaranteed bit rate (GBR), non-guaranteed bit rate (nGBR), and the like. The traffic priority can also comprise a routing priority associated with the at least one second data packet, such as Unsolicited Grant Service (UGS), Real-Time Polling Service (rtPS), Non-Real-Time Polling Service (nrtPS), Best Effort (BE), and so forth. The traffic priority of the at least one second data packet can provide a factor which can be used in determining whether to adjust a number of permitted retransmissions of the at least one second data packet from the access node to the wireless device.

Then, in operation 522, a number of permitted retransmissions of the at least one second data packet from the access node to the wireless device is adjusted. The adjustment can be based on the round trip time and the frequency band load. In an embodiment, the number of permitted retransmissions can be adjusted based on the round trip time, the frequency band load, and the determined modulation and coding scheme. In another embodiment, the number of permitted retransmissions can be adjusted based on based on the round trip time, the frequency band load, and the determined application requirement. In yet another embodiment, the number of permitted retransmissions can be adjusted based on the round trip time, the frequency band load, and the traffic priority of the at least one second data packet. Other examples, including combinations of the foregoing, are also possible. For example, the number of permitted retransmissions can be adjusted based on based on the round trip time, the frequency band load, the determined modulation and coding scheme, the determined application requirement, and the traffic priority of the at least one second data packet.

For example, wireless device 402 can send a request to data source 412 for the first data packets. Data source 412 can provide the first data packets to gateway node 406 via communication network 410, and the first data packets can be encoded into at least one second data packet at gateway node 406, wherein the at least one data packet comprises at least two first data packets. Gateway node 406 can provide the at least one second data packet to access node 404, and the at least one second data packet can be scheduled for delivery to wireless device 402 from access node 404. Initially, the number of permitted retransmissions from access node 404 to wireless device 402 can be set to a relatively low number, including zero. As the at least one second data packet is delivered to wireless device 402, the round trip time associated with the delivery of the at least one second data packet can be determined to increase. An increase in the round trip time can be associated with the loss of second data packets over communication link 414, with network congestion, and the like. Packet loss may reach a level at which the decoding of second data packets at wireless device 402 to recover the first data packets may be insufficient to mitigate the loss of the second data packets. In such case, retransmission of second data packets from access node 404 to wireless device 402 can be increased. In addition to the round trip time, additional factors can be used to determine whether to adjust the number of permitted retransmissions of the second data packets. For example, the frequency band load can provide an indication of the severity of expected second data packet loss. As another example, the modulation and coding scheme used to deliver the second data packets to the wireless device can provide an indication of the distance of the wireless device from the access node. The farther the wireless device from the access node, the greater the anticipated second data packet loss may be. As another example, the application requirement of the application running on the wireless device can provide an indication of the tolerance of the application for delay; the lower the delay tolerance, the greater the number of permitted retransmissions can be adjusted to be. As yet another example, the traffic priority of the at least one second data packet sent to the application can provide an indication of the relative importance of the second data packet traffic; the higher the traffic priority, the greater the number of permitted retransmissions can be adjusted to be.

Additionally, or alternatively, a retransmission overhead associated with a retransmission of the at least one second data packet from the access node to the wireless device is determined (operation 520). The retransmission overhead can comprise an amount of communication link resources dedicated to re-delivering a second data packet from access node 404 to wireless device 402. The retransmission overhead can comprise an amount of bandwidth, a number of slots, a number of frames, and number of subbands, a number of physical resource blocks (PRBs), a number of resource elements (REs), or another indication of an amount of communication link resources. The retransmission overhead can provide an additional factor for adjusting the number of permitted retransmissions of the at least one second data packet from the access node to the wireless device. For example, the number of permitted retransmissions can be adjusted based on based on the round trip time, the frequency band load, the determined modulation and coding scheme, the determined application requirement, the traffic priority of the at least one second data packet, and the retransmission overhead associated with a retransmission of the at least one second data packet from the access node to the wireless device.

Figure 6:
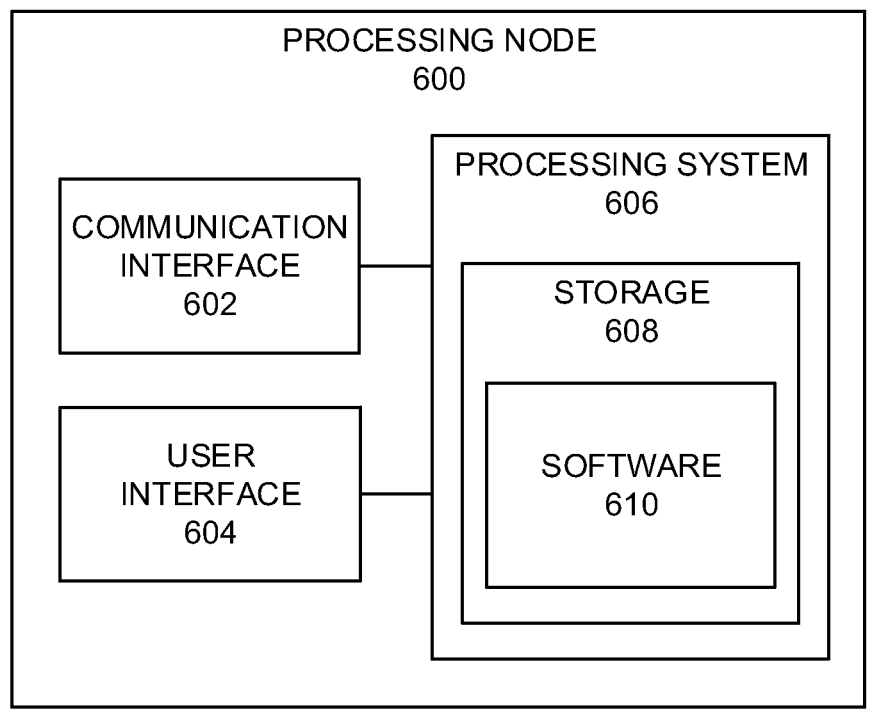
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to managing data retransmission to a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access node 104, network element 106, data source 110, access node 304, network element 306, data source 310, access node 404, gateway node 406, controller node 408, and data source 412. Processing node 600 can also be an adjunct or component of a network element, such as any of the foregoing. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of managing data retransmission to a wireless device, comprising:
   receiving at a network element first data packets for the wireless device and encoding the first data packets into at least one second data packet, the second data packet comprising at least two of the first data packets, and sending the at least one second data packet from the network element to the wireless device;
   determining a round trip time related to the at least one second data packet;
   determining a frequency band load of a frequency band between an access node and the wireless device to deliver the at least one second data packet to the wireless device;
   determining a modulation and coding scheme assigned to a communication link between the access node and the wireless device; and
   adjusting a number of permitted retransmissions of the at least one second data packet from the access node to the wireless device based on the round trip time, the frequency band load, and the modulation and coding scheme.

2. The method of claim 1, further comprising:
   resending the at least one second data packet from the network element to the wireless device when a number of retransmissions of the at least one second data packet from the access node to the wireless device meets the adjusted number of permitted retransmissions of the at least one second data packet.

3. The method of claim 1, further comprising:
   determining an application requirement of an application running on the wireless device, wherein the at least one second data packet is sent to the application; and
   adjusting a number of permitted retransmissions of the at least one second data packet from the access node to the wireless device based on the round trip time, the frequency band load, the modulation and coding scheme, and the determined application requirement.

4. The method of claim 1, further comprising:
   determining a traffic priority of the at least one second data packet sent to the application; and
   adjusting a number of permitted retransmissions of the at least one second data packet from the access node to the wireless device based on the round trip time, the frequency band load, the modulation and coding scheme, and the traffic priority of the at least one second data packet.

5. The method of claim 1, further comprising:
   determining a retransmission overhead associated with a retransmission of the at least one second data packet from the access node to the wireless device; and
   adjusting a number of permitted retransmissions of the at least one second data packet from the access node to the wireless device based on the round trip time, the frequency band load, the modulation and coding scheme, and the determined retransmission overhead.

6. A system of managing data retransmission to a wireless device, comprising:
   a processing node, further configured to:
   receive at a network element first data packets for the wireless device and encoding the first data packets into at least one second data packet, the second data packet comprising at least two of the first data packets, and sending the at least one second data packet from the network element to the wireless device;

determine a round trip time related to the at least one second data packet;

determine a frequency band load of a frequency band between an access node and the wireless device to deliver the at least one second data packet to the wireless device;

determine an application requirement of an application running on the wireless device, wherein the at least one second data packet is sent to the application; and adjust a number of permitted retransmissions of the at least one second data packet from the access node to the wireless device based on the round trip time, the frequency band load, and the application requirement.

7. The system of claim 6, wherein the processing node is further configured to:

resend the at least one second data packet from the network element to the wireless device when a number of retransmissions of the at least one second data packet from the access node to the wireless device meets the adjusted number of permitted retransmissions of the at least one second data packet.

8. The system of claim 6, wherein the processing node is further configured to:

determine a modulation and coding scheme assigned to a communication link between the access node and the wireless device; and adjust a number of permitted retransmissions of the at least one second data packet from the access node to the wireless device based on the round trip time, the frequency band load, the application requirement, and the determined modulation and coding scheme.

9. The system of claim 6, wherein the processing node is further configured to:

determine a traffic priority of the at least one second data packet sent to the application; and adjust a number of permitted retransmissions of the at least one second data packet from the access node to the wireless device based on the round trip time, the frequency band load, the application requirement, and the traffic priority of the at least one second data packet.

10. The system of claim 6, wherein the processing node is further configured to:

determine a retransmission overhead associated with a retransmission of the at least one second data packet from the access node to the wireless device; and adjust a number of permitted retransmissions of the at least one second data packet from the access node to the wireless device based on the round trip time, the frequency band load, the application requirement, and the determined retransmission overhead.

11. A method of managing data retransmission to a wireless device, comprising:

receiving at a network element first data packets for the wireless device and encoding the first data packets into at least one second data packet, the second data packet comprising at least two of the first data packets, and sending the at least one second data packet from the network element to the wireless device;

determining a round trip time related to the at least one second data packet;

determining a frequency band load of a frequency band between an access node and the wireless device to deliver the at least one second data packet to the wireless device;

determining a retransmission overhead associated with a retransmission of the at least one second data packet from the access node to the wireless device;

adjusting a number of permitted retransmissions of the at least one second data packet from the access node to the wireless device based on the round trip time, the retransmission overhead, and the frequency band load; and resending the at least one second data packet from the network element to the wireless device when a number of retransmissions of the at least one second data packet from the access node to the wireless device meets the adjusted number of permitted retransmissions of the at least one second data packet.

* * * * *